Sept. 21, 1965 T. MUNROE 3,207,096
PALLET STRUCTURE
Filed Nov. 26, 1963 3 Sheets-Sheet 1
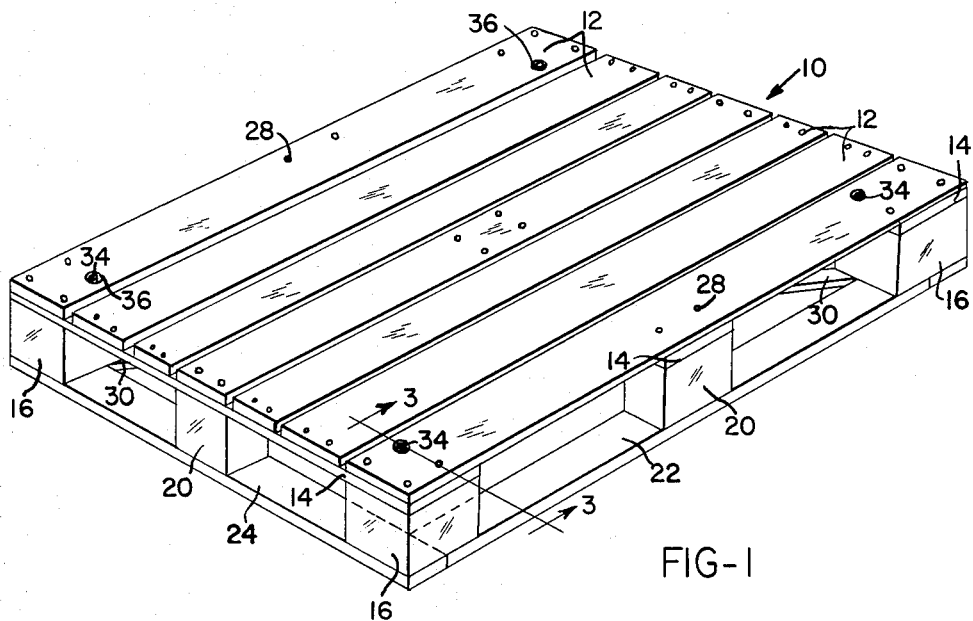
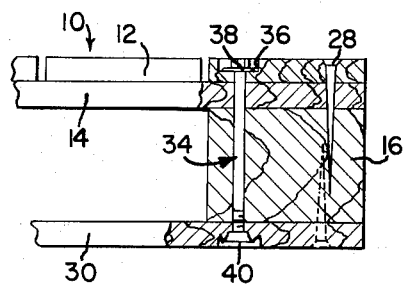
INVENTOR.
THOMAS MUNROE
BY Toulmin & Toulmin
ATTORNEYS Sept. 21, 1965  T. MUNROE  3,207,096
PALLET STRUCTURE Filed Nov. 26, 1963  3 Sheets-Sheet 2

INVENTOR.
THOMAS MUNROE
BY Toulmin & Toulmin
ATTORNEYS

Sept. 21, 1965   T. MUNROE   3,207,096
PALLET STRUCTURE

Filed Nov. 26, 1963   3 Sheets-Sheet 3

INVENTOR.
THOMAS MUNROE
BY Toulmin & Toulmin
ATTORNEYS

3,207,096
PALLET STRUCTURE
Thomas Munroe, Dayton, Ohio, assignor to Moraine Box Company, Dayton, Ohio, a corporation of Michigan
Filed Nov. 26, 1963, Ser. No. 325,903
7 Claims. (Cl. 108—58)

The present invention relates to a pallet structure such as is employed for receiving loads to be moved about by a lift truck, and is particularly concerned with an improved high strength pallet structure of this nature.

Pallet structures, are, of course, commonly known, are employed for receiving loads that are to be moved about and which loads are sometimes stacked for storage purposes. Pallets of this nature are sometimes heavily loaded and at other times will receive fairly light loads, but even in the case of a lightly loaded pallet, the pallet might be subjected to considerable physical abuse from being moved about and dropped or from being run into an obstruction while being moved about. In any case, a pallet structure of the nature referred to is fairly expensive and it is important that the pallet structures remain in use for a considerable length of time in order to hold to a minimum the cost entailed in the use of the pallet.

Users of pallets of this nature have relatively rigid requirements with respect to the stability of the pallet structure on account of the stacking of pallets with loads on them. By stability is meant the ability of the pallet structure to resist deformation when subjected to loads, for example, at the corner thereof. As an example, a pallet structure of the nature referred to might weigh as much as one hundred pounds and is tested by dropping it to a hard floor from a height of several feet on one corner, and under these circumstances it is required that the lengths of the respective diagonals of the pallet shall not vary more than about one-half inch.

In attempting to meet the foregoing requirements it has been suggested to apply metal bracing straps across the pallet in a diagonal direction and connected thereto. Pallets constructed in this manner, however, are not particularly stable because the nails or other fasteners holding the metal bracing straps in position will pull out or be sheared off or the metal straps themselves will break unless made excessively heavy.

By test and experimentation I have found that a pallet structure can be manufactured which meets the exacting requirements while the pallet structure remains of reasonable size and weight and cost.

A primary object of the present invention is the provision of an improved pallet structure having great strength and resistance to deformation.

Another object of the present invention is to provide a pallet structure braced against deformation in which the bracing means employed is particularly effective in preventing the pallet structure from being deformed and wherein the said bracing means itself is extremely strong.

Still another object of this invention is the provision of a pallet structure which can be manufactured in a substantially conventional manner but which will be possessed of resistance to deformation, particularly in the diagonal direction thereof to an extent not heretofore possible in pallet structures of the nature referred to.

Still another object of this invention is the provision of a pallet structure which is essentially of the type having a complete deck only on the top but wherein the body of the pallet is so constructed and arranged that it is adapted to be handled by substantially any type and size of automatic conveyor equipment. In particular, the last mentioned object is accomplished by the provision of a frame about the bottom of the pallet structure and diagonals thereacross which create a platform so that the pallet structure is adequately and properly supported on any form of automatic conveyor.

These and other objects and advantages of this invention will become more apparent upon reference to the following specification taken in connection with the accompanying drawings, in which:

FIGURE 1 is a perspective view of a pallet structure according to the present invention looking down on top thereof;

FIGURE 3 is a cross sectional view through one corner of the pallet structure as indicated by line 3—3 on FIGURE 1;

Figure 2:
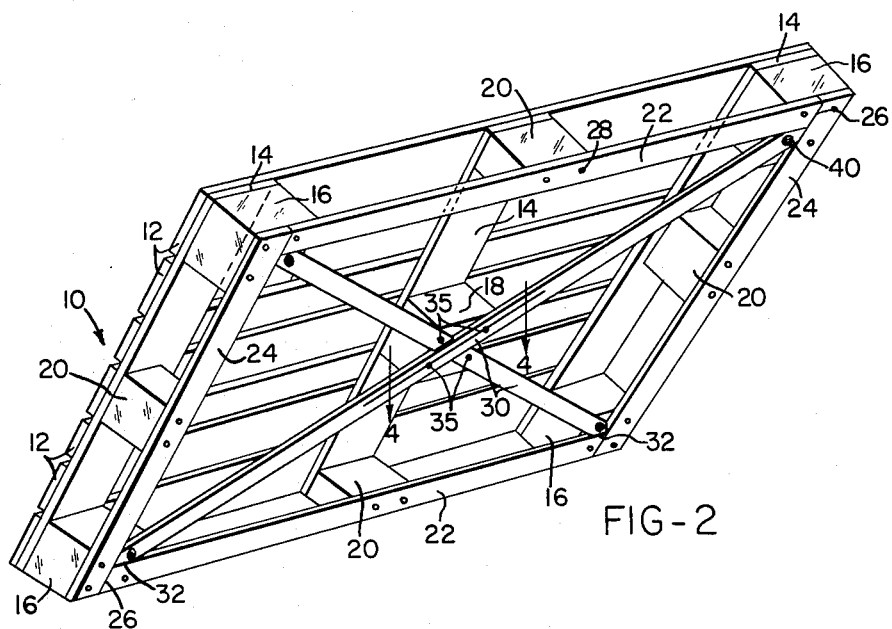
FIGURE 2 is a view similar to FIGURE 1 but looking up at the botom of the pallet structure.

Referring to the drawings somewhat more in detail, a pallet according to the present invention is a rectangular member comprising an upper deck 10 that can be made up of longitudinally extending strips 12 preferably of wood. These strips 12 rest on the laterally extending strips 14 which are arranged one at each end of the deck and one in the center, and all of the strips 14 extending at right angles to the strips 12.

Beneath the end strips 14 and at the ends thereof are corner blocks 16 which may, for example, be on the order of six inches on each side and which are also of wood. A still further block of this dimension is indicated at 18 and is disposed in the center of the center one of lateral strips 14.

Further blocks which may be on the order of 6 x 6 x 3 inches in size are indicated at 20 and are positioned in the ends of the center one of strips 14 and in the centers of the end ones of strips 14.

The bottom of the pallet is provided with a rectangular frame consisting of side strips 22 and end strips 24 having their ends in abutting engagement at 26. This frame, as well as the aforementioned deck, is secured to the blocks 16, 18 and 20 as by nails 28 preferably arranged in a pattern that will permit insertion of the nails in an automatic nailing machine.

The particular feature of the present invention that imparts extreme strength and stability to the pallet consists of the diagonally extending brace members 30 which are located inside the frame made up of strips 24 and which diagonal members have ends 32 shaped to abuttingly engage the inside of the aforementioned frame in the corners. The nature of this abutment will best be seen in FIGURE 4.

Figure 4:
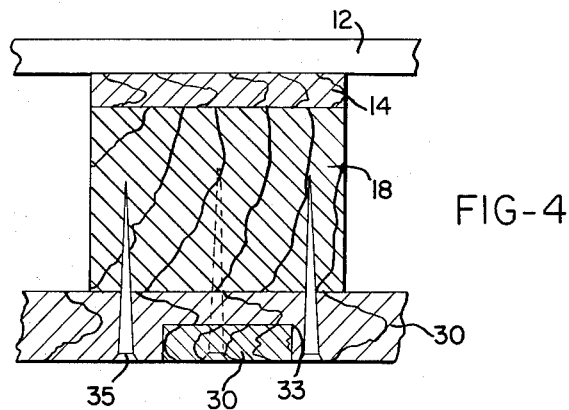
FIGURE 4 is a sectional view indicated by line 4—4 on FIGURE 2 showing the connection of the brace members on the bottom of the pallet to a block forming a part of the pallet structure.

The brace members 30 are notched and inter-fitted where they cross as indicated at 33 in FIGURE 4 so that the bottom of the pallet structure forms a plane surface and whereby the pallet will rest firmly on a flat surface. Nails 35 secure the diagonals in the region of the point of inter-fit thereof to center block 18 while the bolts and nuts 36 are provided at the ends of the brace members to secure them to the bolts of the corner blocks 16. As will be seen in FIGURE 3, the nut and bolt means 34 extend completely through the deck 10, the pertinent corner block 16 and the adjacent end of the pertaining brace member 30. The strip 12 of the deck through which the bolt extends is counter-bored at 36 and a large washer 38 is disposed in the counter-bore and beneath the head of the bore. At the threaded end of the bore the nut means comprises the member 40 which is known as a T nut and which is a relatively large formed sheet metal member receivable in a hole in brace member 30 and having tangs adjacent the periphery that drive into the wood, thereby fixedly to support the nut in place while holding it against rotation.

I have found that the use of the nut and bolt means referred to provides for extremely strong corners on the pallet and provides for holding the brace members firmly in place at their ends while also holding the deck firmly in place at the top of the pallet, and provides means for distributing loads throughout the pallet structure, particularly lateral loads that would tend to deform the pallet. The bolt means is of adequate cross section to prevent shearing thereof under the most extreme loads and furthermore holds the brace members and the deck of the pallet in tight frictional engagement with the corner blocks 16 to prevent relative slipping therebetween, and also provides means whereby the pallet structure can be tightened up if it becomes loose. The opposite ends of the nut and bolt means does not, of course, project beyond the top deck and the brace member so that both top and bottom of the pallet structure are planar.

The diagonal bracing arrangement referred to has proved to be extremely strong and resists deformation of the pallet even when dropped on one corner. The brace members are strong in tension and particularly on account of the nut and bolt means by means of which they are sealed to corner blocks 16, while the brace members also act as compression members and have resilience in this respect that tends to prevent deformation of the pallet along a diagonal in a manner not possible when using bracing metal strips as diagonals.

When the pallet is deformed on a diagonal, this deformation is simultaneously resisted by one of the brace members being placed in tension while the other is placed in compression, and any deforming of the pallet that does result from its inherent resilience is counteracted by the brace members and, at this time, an important factor contributing to the preventing of permanent deformation of the pallet is the brace member that is in compression. Any deformation of the pallet in a diagonal direction is thus destroyed and no substantial amount of permanent deformation results even, as mentioned, from repeated dropping of the pallet on one corner.

In the pallet structure described, the forks of a lift truck introduced through the ends of the pallet will engage beneath the transverse members 14 at one end and in the middle of the pallet. Due to the possibility of an unbalanced load there is some chance that a pallet of this nature will tilt on the lift truck. With this in mind, the present invention proposes the modification of FIGURES 5, 6 and 7. This modification eliminates the possibility of the pallet tilting on the fork of a lift truck and it is also somewhat more substantial than the first described modification.

Figure 5:
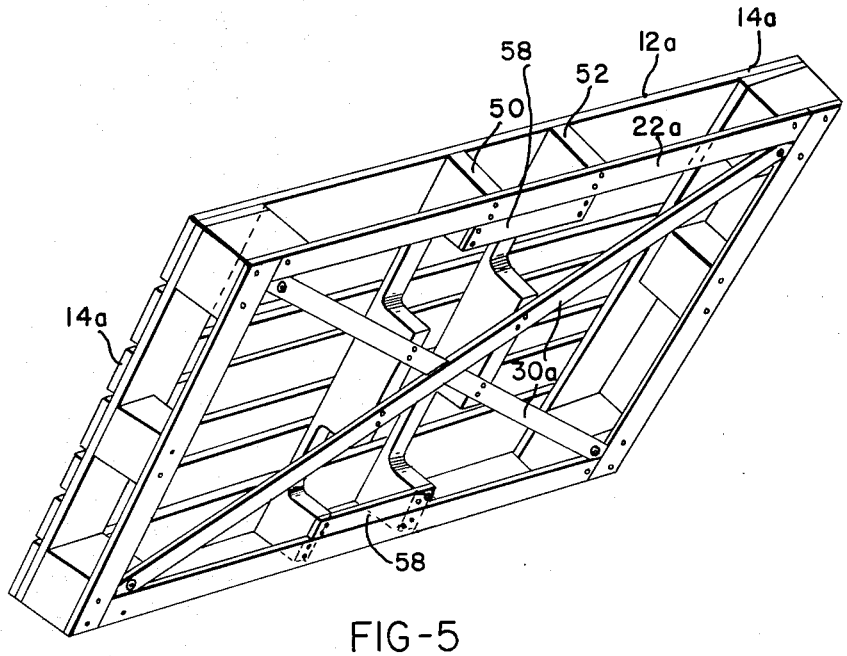
FIGURE 5 is a perspective view of a modification.
Figure 6:
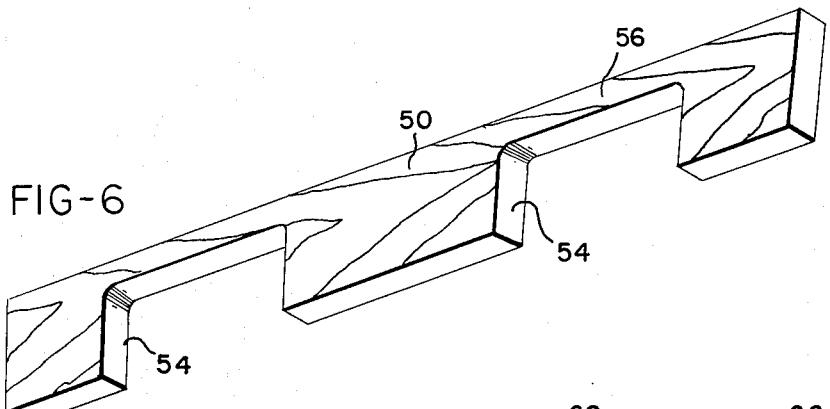
FIGURE 6 is a perspective view shov.ing one of the central sill members of the FIGURE 5 modification.
Figure 7:
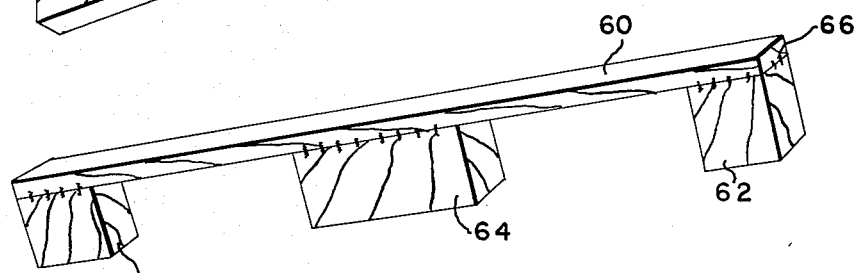
FIGURE 7 is a view like FIGURE 6 but shows another form which the sill members can take.

In FIGURE 5 parts corresponding to the same parts of the first described modification bear the same reference numerals with the addition of subscript *a*. In this modification however the central block 18 and the intermediate transverse members 14 are eliminated, and instead there are provided the longitudinally spaced sill members 50 and 52 each of which extends transversely of the pallet and is connected between top deck 12*a* and bottom rails 22*a*, and are also secured to the diagonals 30*a*. Each sill is constructed as shown in FIGURES 6 and 7. In FIGURE 6 the sill comprises the wooden piece having cut-outs 54 which, as will be seen in FIGURE 5, provide the spaces through which the forks of a lift truck can extend. The regions 56 at the bottom of the cut-outs are of the same thickness as the transverse members 14*a* beneath the top deck of the pallet at the opposite ends so the pallet will be supported horizontally on the forks on a lift truck.

The end portions of sill 50 are made wide enough to receive the members 58 which increase the area of the bottom deck of the pallet and additionally brace the sill members and strengthen the pallet.

In FIGURE 7 the sill member is made up of a top rail 60 and blocks 62 at the ends and 64 in the middle connected to the rail in any suitable means as, for example, by dovetail drive in connector elements 66.

With either type of pallet, the advantage exists that the pallet will move on a roller conveyor or a chain conveyor with equal safety, which heretofore has only been possible with pallets having complete upper and lower decks. The lower deck of the pallet according to the present invention is adequate to provide balancing for the pallet for any type conveyor and for stacking of the pallets, but the pallet is nevertheless lighter than the conventional double faced pallet and is far stronger than a stringer type pallet.

Pallets of the nature disclosed herein are extremely strong and the provision of the large blocks between the upper deck of the pallet and the base structure prevent collapsing of the pallets even under heavy loads.

It will be understood that this invention is susceptible to modification in order to adapt it to different usages and conditions; and accordingly, it is desired to comprehend such modifications within this invention as may fall within the scope of the appended claims.

I claim:

1. In a pallet; an upper load receiving deck, support blocks secured to the bottom of said deck at the corners and in the center, strips having their ends in the area of abutting relation and secured to the bottoms of the corner blocks to form a bottom frame for the pallet, said bottom frame having corners at said corner blocks, brace members extending diagonally inside said frame and having ends abutting said strips inside the corners of said frame, said brace members being notched and interfitting where they cross so as to be coplanar, and means securing said brace members to said blocks, said brace members lying in the same plane as said bottom frame to also provide a larger contact surface for said bottom frame.

2. In a pallet; an upper load receiving deck, support blocks secured to the bottom of said deck at the corners and in the center, strips having their ends in abutting relation and secured to the bottom of the corner blocks to form a bottom frame for the pallet, said bottom frame having corners at said corner blocks, brace members extending diagonally inside said frame and having ends abutting said strips inside the corners of said frame, said brace members being notched and interfitting where they cross so as to be coplanar, bolts securing the ends of the brace members to the corner blocks, and means securing the diagonals to the center block, said brace members lying in the same plane as said bottom frame to also provide a larger contact surface for said bottom frame.

3. In a pallet; an upper load receiving deck, support blocks secured to the bottom of said deck at the corners and in the region of the center, strips having their ends in abutting relation and secured to the bottoms of the corner blocks to form a bottom frame for the pallet, said bottom frame having corners at said corner blocks, brace members extending diagonally inside said frame and having ends abutting said strips inside the corners of said frame, said brace members being notched and interfitting where they cross so as to be coplanar, bolts securing the ends of the brace members to the corner blocks and extending completely through said corner blocks and said deck, an additional block means secured between said deck and said frame between said corner blocks, said pallet being rectangular and said deck comprising lateral strips resting on said blocks and block means and longitudinal strips resting on said lateral strips, said brace members lying in the same plane as said bottom frame to also provide a larger contact surface for said bottom frame.

4. In a pallet; an upper load receiving deck, support blocks secured to the bottom of said deck at the corners and in the center, strips having their ends in substantially right angle abutting relation and secured to the bottoms of the corner blocks to form a bottom frame for the pallet, said bottom frame having corners at said corner blocks, brace members extending diagonally inside said frame and having ends abutting said strips inside the corners of said frame, said brace members being notched and interfitting where they cross so as to be coplanar, bolts securing the ends of the brace members to the corner blocks and extending completely through said corner blocks and said deck, and additional block means secured between said deck and said frame between said corner blocks, said pallet being rectangular and said deck comprising lateral strips resting on said blocks and block means and longitudinal strips resting on said lateral strips, nails securing said deck and frame to said corner blocks and block means and securing said brace members to said center block, and bolts extending completely through said deck and corner blocks and the ends of said brace members, said brace members lying in the same plane as said bottom frame to also provide a larger contact surface for said bottom frame.

5. In a pallet; an upper load receiving deck, support blocks secured to the bottom of said deck at least at the corners thereof, strips in abutting relation at their ends forming a frame and secured to the bottoms of said blocks, brace members extending diagonally inside said frame and having ends abutting said strips, said brace members interfitting where they cross so as to be coplanar with each other and with said strips, bolt means securing the ends of the brace members to the blocks, and sill members extending parallel to the ends of the pallet and spaced on opposite sides of the center of the pallet and secured between the deck of the pallet and said strips and brace members, said sill members being relieved on the bottom between the center and the ends thereof to permit the fork of a lift truck to be inserted into the pallet from either end immediately above said strips and brace members.

6. In a pallet; an upper load receiving deck, support blocks secured to the bottom of said deck at least at the corners thereof, strips in abutting relation at their ends forming a frame and secured to the bottoms of said blocks, brace members extending diagonally inside said frame and having ends abutting said strips, said brace members interfitting where they cross so as to be coplanar with each other and with said strips, bolt means securing the ends of the brace members to the blocks, and sill members extending parallel to the ends of the pallet and spaced on opposite sides of the center of the pallet and secured between the deck of the pallet and said strips and brace members, each said sill member comprising a top rail and block members secured to the bottom thereof at the center and at the ends whereby each sill member has a relieved space on the bottom on each side of the center to permit the fork of a lift truck to be inserted into said pallet from either end immediately above said strips and brace members.

7. In a pallet; an upper load receiving deck, suppport blocks secured to the bottom of said deck at least at the corners thereof, strips in abutting relation at their ends forming a frame and secured to the bottoms of said blocks, brace members extending diagonally inside said frame and having ends abutting said strips, said brace members interfitting where they cross so as to be coplanar with each other and with said strips, bolt means securing the ends of the brace members to the blocks, and sill members extending parallel to the ends of the pallet and spaced on opposite sides of the center of the pallet and secured between the deck of the pallet and said strips and brace members, said sill members being relieved on the bottom between the center and the ends thereof to permit the fork of a lift truck to be inserted into the pallet from either end immediately above said strips and brace members, the unrelieved end portions of the sills projecting inwardly from the frame, and other strips extending between and secured to the projecting inner ends of said portions at each side of the pallet coplanar with said frame and brace members.

References Cited by the Examiner

UNITED STATES PATENTS

| 2,468,026 | 4/49 | Boone | 108—57 |
| 2,486,284 | 10/49 | Horwitz | 108—52 |
| 2,498,414 | 2/50 | Gondar | 108—56 X |
| 2,503,022 | 4/50 | Benoist et al. | 108—56 X |
| 2,542,129 | 2/51 | Fletcher | 108—52 |
| 2,597,411 | 5/52 | Vankrimpen | 108—57 |
| 2,868,487 | 1/59 | Robinson | 108—57 |
| 2,922,606 | 1/60 | Glassman et al. | 108—56 |
| 2,967,036 | 1/61 | Phillips | 108—57 |

FOREIGN PATENTS 924,258　2/55　Germany.

FRANK B. SHERRY, *Primary Examiner.*